United States Patent [19]

Huber

[11] Patent Number: 5,422,000
[45] Date of Patent: Jun. 6, 1995

[54] DEVICE FOR CLEANING LARGE QUANTITIES OF WATER FROM RAKINGS

[76] Inventor: Hans G. Huber, Zum Rachental 8, D-92334 Berching, Germany

[21] Appl. No.: 145,394
[22] Filed: Oct. 29, 1993
[30] Foreign Application Priority Data Nov. 3, 1992 [DE] Germany .................. 42 37 123.6

[51] Int. Cl.$^6$ .................... B01D 35/02; B01D 35/027; B01D 29/64
[52] U.S. Cl. .................................. 210/162; 210/357; 210/358; 210/413; 210/415; 210/474; 210/497.01
[58] Field of Search ............... 210/154, 162, 357, 358, 210/413, 414, 415, 497.01, 498, 474, 475

[56] References Cited

U.S. PATENT DOCUMENTS

| 184,815 | 11/1876 | Adamson . |
| 493,403 | 3/1893 | Holmes . |
| 546,708 | 9/1895 | Pierce . |
| 1,143,496 | 6/1915 | Briles . |
| 2,776,755 | 1/1957 | Craig . |
| 2,830,695 | 4/1958 | Fennimore . |
| 2,910,181 | 10/1959 | Schade . |
| 2,929,504 | 3/1960 | Lind . |
| 3,255,074 | 6/1966 | Salomon . |
| 4,153,557 | 5/1979 | Hori . |
| 4,415,462 | 11/1983 | Finch . |
| 4,424,129 | 1/1984 | Burger . |
| 4,601,819 | 7/1986 | Pellhammer . |
| 4,713,179 | 12/1987 | Goedderz . |
| 4,859,322 | 8/1989 | Huber . |
| 5,006,236 | 4/1991 | Croket . |
| 5,013,430 | 5/1991 | Mileson . |
| 5,078,865 | 1/1992 | Huber . |
| 5,110,461 | 5/1992 | Abel . |
| 5,232,587 | 8/1993 | Hegemier . |

FOREIGN PATENT DOCUMENTS

| 265385 | 4/1988 | European Pat. Off. . |
| 212048 | 5/1908 | Germany . |
| 2142540 | 3/1973 | Germany . |
| 8707094 | 10/1987 | Germany . |
| 4037884 | 6/1992 | Germany . |
| 9205674 | 9/1992 | Germany . |
| 2-013622 | 1/1990 | Japan . |
| 3-262506 | 11/1991 | Japan . |
| 4-174145 | 6/1992 | Japan . |
| 190659 | 5/1937 | Switzerland . |
| 6172 | of 1913 | United Kingdom . |
| 1525871 | 9/1978 | United Kingdom . |
| 1605964 | 11/1990 | U.S.S.R. . |
| 1663135 | 7/1991 | U.S.S.R. . |
| 9208539 | 5/1992 | WIPO . |

Primary Examiner—Thomas M. Lithgow
Attorney, Agent, or Firm—Hopkins & Thomas

[57] ABSTRACT

A device for cleaning large quantities of water (3) of rakings at overflow edges (2), especially from rain water reservoirs, rivers, etc., with a stationary separation area (10), which is formed as a section of a cylinder jacket (7) with an axis (8) parallel to the overflow edge, through which the quantity of water flows is provided. A takeover device (11), which is driven about an axis (8) of the cylinder jacket (7), is assigned to the separation area (10) for removing the rakings separated at the separation area (10).

6 Claims, 3 Drawing Sheets

DEVICE FOR CLEANING LARGE QUANTITIES OF WATER FROM RAKINGS

BACKGROUND OF THE INVENTION

The invention is related to a device for cleaning large quantities of water and rakings at overflow edges. In different applications the necessity arises to sieve and clear rakings of large quantities of water. When, for instance, a large quantity of cooling water is to be taken from a river, an overflow edge is usually created, and the overflowing water is used. This should, depending on the requirements, be free of matter ranging from rakings to suspended particles. Local sewage technique also has the problem to sieve large quantities of water, especially during and after the event of a heavy rain, e.g. a thunderstorm. Then a large quantity of water is accumulated in a relatively short time, which the sewage plant is not designed to cope with. Rain reservoirs and rain overflow basins are then used, to store the surplus quantity of water intermediately and to work it off after the end of the rain event. But such rain reservoirs also have a limited capacity, which in some cases will be exceeded, so that the surplus water will then be routed e.g. into a river untreated. Especially during such thunderstorms or after dry weather periods the water carries a lot of dirt that should be separated off.

A device of the above described type is known from the German Offenlegungsschrift 40 37 884. The separation area is formed to be a section of a cylinder jacket and arranged with its axis lying parallel to the overflow edge. The separation area extends over about 90° of tile cylinder jacket, and the axis of the cylinder jacket is provided a distance corresponding to about the radius of the cylinder jacket below the overflow edge, so that the water flowing over the overflow edge is supplied at about the highest point of the cylinder jacket. The separation area is thereby limited in area, and there is the danger that after a blocking of the separation area the water will flow over the device into a drainage channel untreated. A takeover device, which is driven about the axis of the cylinder jacket, is assigned to the separation area for removing the rakings separated at the separation area. The takeover device is driven by the overflowing water itself, so that the drive is dependant on the water level above the overflow edge. At a low water level there is the danger that the takeover device is not driven anymore. At a high water level there is the danger that the separation area, which is limited in area, is blocked quickly and that the following water flows over it untreated.

SUMMARY OF THE INVENTION

It is the object of the invention to provide a device of the type described above, with which large quantities of water can be cleaned reliably, without the danger of the separation area being blocked.

According to the invention this is achieved when the separation area with its axis is arranged at about the height of the overflow edge and extends arching to the top or bottom over about 180° of the lying cylinder jacket, so that there is a forced flow through the separation area, and that a transverse conveyor for transporting the separated rakings to the side is provided.

This device provides an effectively enlarged separation area. The axis of the cylinder jacket of the separation area in the form of a cylinder jacket is arranged at the same height as the overflow edge, so that there is the possibility to make use of the enlarged separation area. There is a forced flow, i.e. the incoming liquid must pass through the separation area. Should the driven takeover device fail the water level will rise and a further section of the separation area, which is not blocked, is provided. At most the water level will rise here. Insofar there is the possibility to use an intermitting drive for the takeover device and to control this in dependence of the water level. It is also possible, though, to operate the takeover device continually or at regular intervals with a time control. By this a continually self cleaning device is created, which has a great operating reliability. The device allows for the separation and removal of the rakings from the large quantity of water, so that these rakings, e.g. leaves, branches, drink cans etc., must not be separated once more.

A transverse conveyor for transporting the separated rakings to the side is provided, so that the direction of flow of the water does not have to be changed. The transverse conveyor has the object to take over the rakings from the takeover device and to laterally transport them away. As a transverse conveyor a screw conveyor device with a housing, a conveyor helix, and a drive may be provided. The axis of the screw conveyor device again extends parallel to the axis of the cylinder section of the separation device as well as parallel to the overflow edge. The rakings are transported away by the transverse conveyor and can be deposited in e.g. a container.

The separation area may be comprised of a number of grating bars arranged parallel to each other. A comb-like rake penetrating the grating bars may be provided as the takeover device. The separation area thereby is formed at a grating of grating bars, where the grating bars; are arranged along perimeter lines of the cylinder and extend over part of the perimeter. Between neighboring grating bars there is a distance through which the comb-like rake penetrates, so that the rakings are removed from the separation area and transported away from the region of the water flowing through by the comb-like rake. At the same time the separation area is cleaned at each pass of the comb-like rake. The distance between the grating bars is decisive for the degree of separation. With relatively large quantities of water the rakings are separated in the sense of a rough cleaning of the water.

It is also possible that the separation area consists of a screen and that the takeover device is provided as a conveyor helix. The conveyor helix then brushes along the screen with its perimeter and carries the separated rakings along. The formation of a separation area at a screen allows for a finer sieving, that is to remove relatively smaller rakings from the water. The geometry of the holes or slits in the screen is decisive for the separated rakings.

In this embodiment the conveyor helix in conjunction with the screen forms the transverse conveyor.

When the separation area is formed at a grating as a section of a cylinder jacket, the separation area may be provided on the outside or inside of the grating bars. When the separation takes place on the outside, the grating bars extend from the overflow edge arching upwards and then again downwards. When the separation area is formed on the inside, the grating bars extend arching downwards from the overflow edge and then rise again, forming a trough for the separated rakings.

A passing-on device, which is formed in a comb-like fashion and penetrates the grating bars, may be assigned to the separation area and the takeover device. This passing-on device has the object to take over the rakings from the takeover device and to route them into the following transverse conveyor. The passing-on device itself is arranged movable, in order to conduct the temporarily stored rakings into the transverse conveyor and thereby be cleaned itself, to be able to conduct more rakings at the next pass of the takeover device.

The passing-on device is suitably supported swivelling outside the perimeter of the takeover device and has a stop for a cam arranged on the shaft of the takeover device. This has the advantage that the passing-on device is moved and cleaned at regular intervals by the drive of the takeover device.

The passing-on device is supported above the transverse conveyor and reaches with its comb-like teeth into the perimeter of the takeover device.

When the takeover device is formed to be a screw conveyor device, with a housing functioning as a screen, then this device forms the transverse conveyor at the same time. The conveyor helix may then merge into an upwards directed conveyor, for instance to enable or make easier the dropping of the rakings into a container.

BRIEF DESCRIPTION OF THE DRAWINGS

The invention will be further explained and described by means of preferred embodiments. The drawings show.

DETAILED DESCRIPTION

Figure 1:
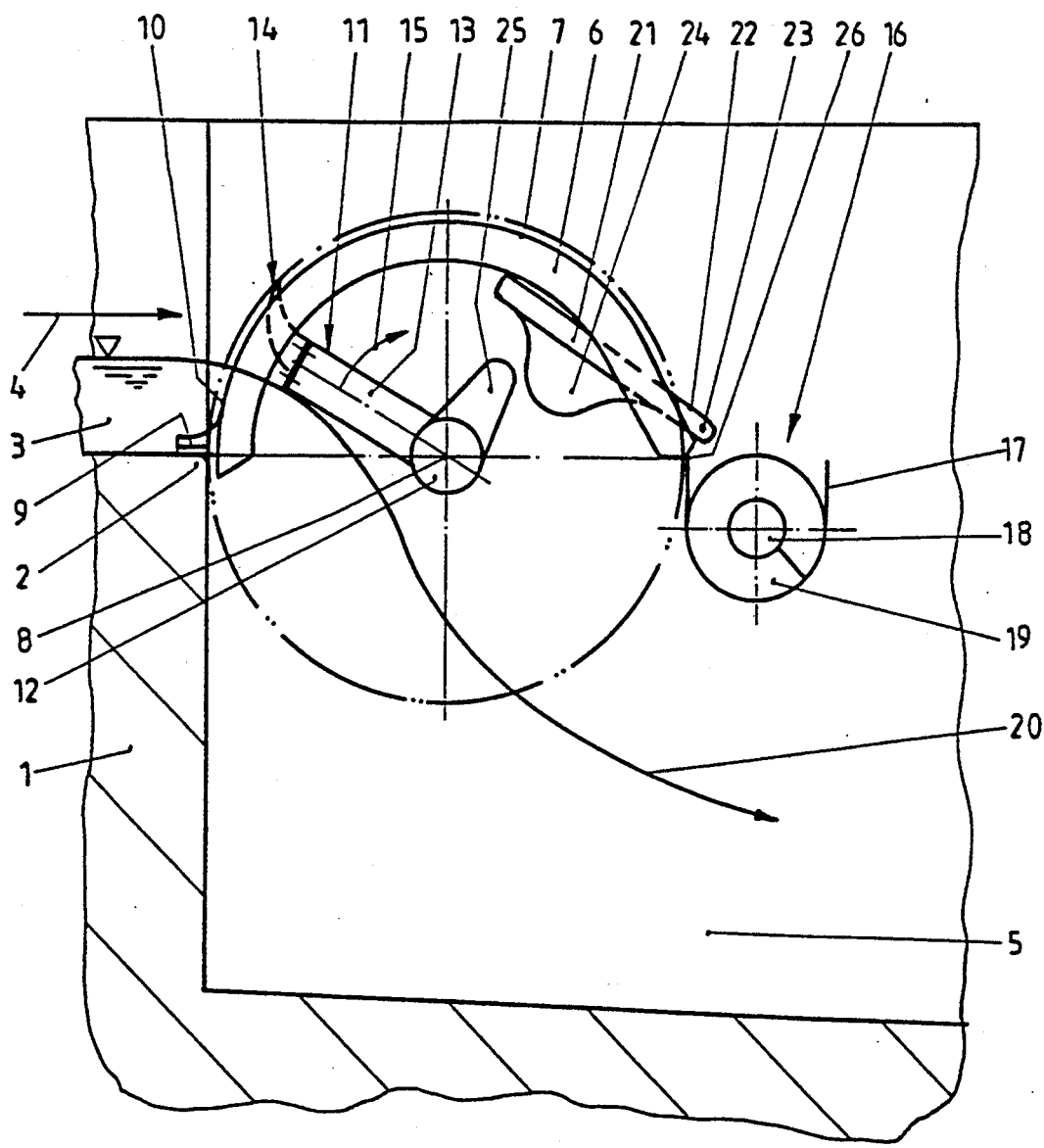
FIG. 1 a vertical cut through the major parts of the device in a first embodiment, FIG. 2 a similar representation of a second embodiment, FIG. 3 a vertical cut through a device in a third embodiment, and FIG. 4 a side view of the device as shown in FIG. 3.

In the area of a vertical wall 1 an overflow edge 2 is formed, over which the large quantity of water 3 to be sieved flows in the direction of the arrow 4. The quantity of water 3 stems from a reservoir, a river or such. Connecting to the overflow edge 2 with respect to wall 1 is an overflow basin 5, into which only cleaned water passes, which can be removed therefrom or conducted elsewhere.

The new device is shown with its major parts relative to the overflow edge 2. There are arched grating bars 6 arranged at a distance next to each other, which extend over about 180° of a lying cylinder jacket 7, whose axis 8 is arranged parallel to and at the height of the overflow edge 2. The grating bars 6 have continuations 9 directed at the overflow edge 2, with which they are supported on the overflow edge 2. The fastening of the device at the place of deployment is not shown further.

The grating bars 6, whose number and distance in between, in the direction of the axis 8, can be chosen constructively, form on their outer side the separation area 10, which starts at the overflow edge 2 and extends arched upwards. It can be seen that the separation area 10 can expand with the quantity of water above the overflow edge 2. By this the separation area 10 adapts itself to the quantity of water, so that it is available for different quantities of water. The grating bars 6 are immovable.

A takeover device 11, which has a shaft 12 and radially extending arms 13, is assigned to the grating bars 6 and the separation area 10 formed thereof. Fingers 14, whose geometry and arrangement are matched to the arrangement of the grating bars 6, are connected to the arms 13. The fingers 14 reach through the gaps between the grating bars 6 and extend beyond the outer circumference of the cylinder jacket 7 with respect to the separation area 10 by a certain amount. The shaft 12 of takeover device 11 is circularly driven by a motor not depicted, e.g. an electric motor, in the direction of the arrow 15 continually or at regular intervals, whereby the fingers 14 of the takeover device enter into gaps between the grating bars 6 in the area of the overflow edge 2 and transport the rakings separated at the separation area 10 upwards. The rakings come out of the area of the quantity of water 3 and fall over the downwardly arched part of the grating bars 6 into the transverse conveyor 16, which may have a housing 17 open at the top, a driven shaft 18 and a conveyor helix 19. It goes without saying that the shaft 18 is driven turning by a drive not depicted, so that the dropped rakings are moved away sideways. With the exception of the separation area 10, through which the water flows, the separated rakings are above an indicated drop-over line 20 and thereby outside of the water. It can be seen that the capacity of the overflow basin 5 is limited by the height of the overflow edge 2, so that the cleaned water has to be removed from this basin or conducted elsewhere. For storage the overflow basin 5 has to be formed large enough.

In order to make the transport of the rakings from the takeover device 11 to the transverse conveyor 16 easier or better, the device may have a passing-on device 21. The passing-on device has as major parts a comb-like rake 22, the fingers or rods of which also extend through the gaps between the grating bars 6. The fingers or rods are supported swivelling about a horizontal axis 23 in a limited way and extend from the outside into the inside of the cylinder jacket 7, by which the grating bars 6 are interspersed. In FIG. 1 one extreme position of the passing-on device 21 is shown, which is secured for instance by a stop not shown. Some or all of the fingers or rods of the passing-on device 21 have on their lower side on the inner side of the device a stop 24, whose downwards turned surface works together with a cam 25 that is mounted in a non-rotating way on the shaft 12. When the shaft 12 and therefore also the cam 25 turn the passing-on device 21 is lifted into a steeper position, so that rakings deposited on the outer free surface of the rake 22 slide down on the now steeper passing-on device and fall into the transverse conveyor 16. At the same time the passing-on device 21 serves to transport the rakings over the upper edge 26 of the housing 17 of the transverse conveyor 16. So one advantage of the passing-on device 21 is that the transverse conveyor 16 can be arranged relatively high. When the transverse conveyor 16 is arranged in the lower part relatively to the cylinder jacket 7, the passing-on device 21 is not needed in most cases. Otherwise the object of the passing-on device 21 is to make sure that no separated rakings get into the cleaned water of the overflow basin 5.

Figure 2:
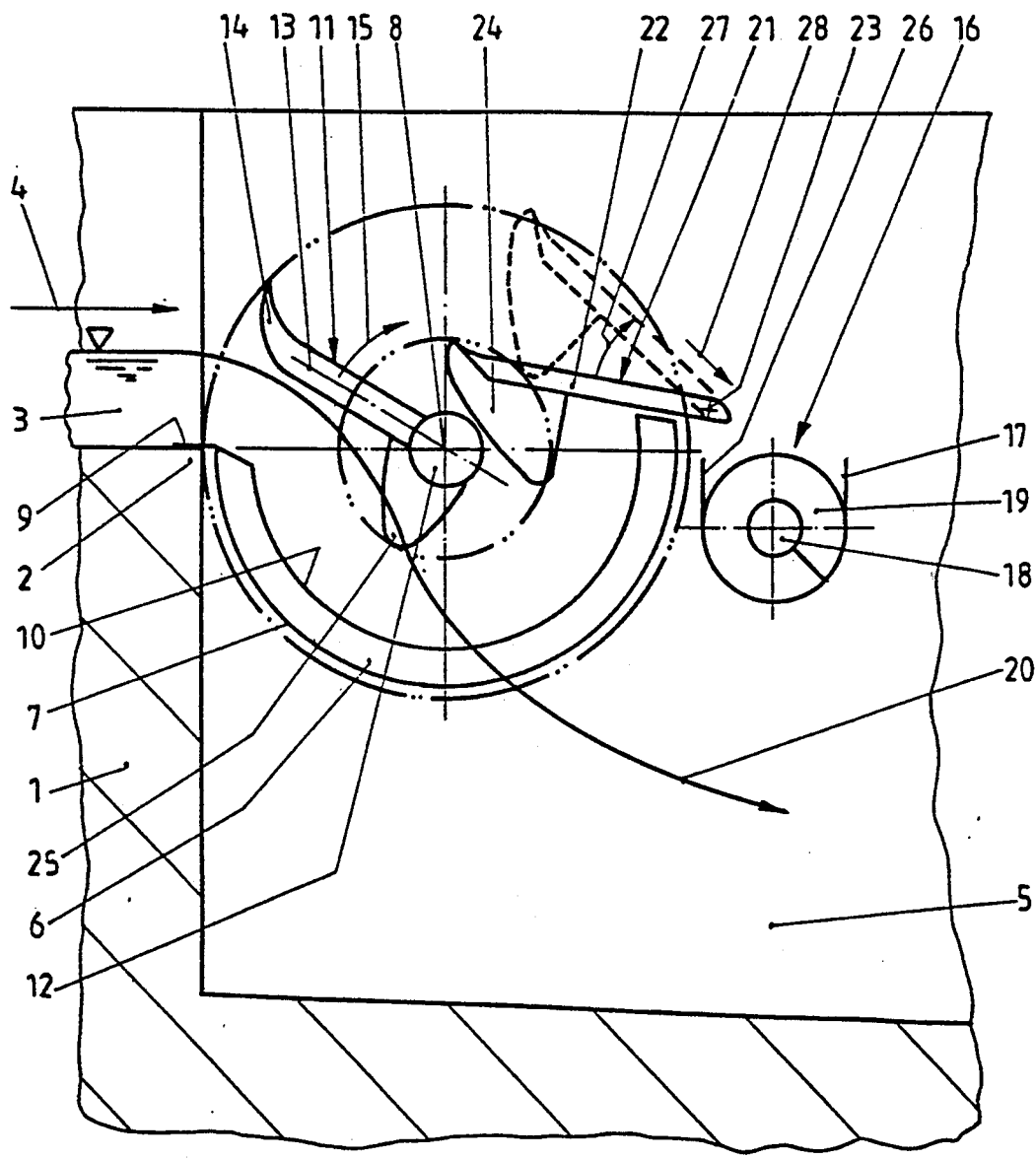

FIG. 2 shows a further embodiment of the device, which in principal is built similarly as the device of FIG. 1, so that reference can be made to the description regarding that. Deviating from the embodiment of FIG. 1 the grating bars 6 are in this case arranged not in the upper section of the cylinder jacket 7 but in the lower section in a immovable fashion, so that the separation area 10 is formed on the inside of the grating bars 6. The takeover device 11 may be formed identically as in the embodiment of FIG. 1. The fingers 14 may be formed arched in the direction shown. A radially straight extension of the fingers 14 is also possible. It can be seen here that the fingers 14 extend relatively further through the separation area 10 in a radial direction, so that a corresponding amount of rakings can be transported upwards by the fingers 14, when the fingers 14 protrude over the area of the grating bars 6 and the drop-over line 20 of the quantity of water 3.

The passing-on device 21 is depicted in its initial position by a solid line and in its swung up position by the broken line. The broken line position is attained by swinging over the cam 25 and the stop 24 in the direction of the arrow 27. The rakings then slide in the direction of the arrow 28 into the transverse conveyor 16. Of course a conveyor belt could be provided instead of the transverse conveyor 16.

Figure 3:
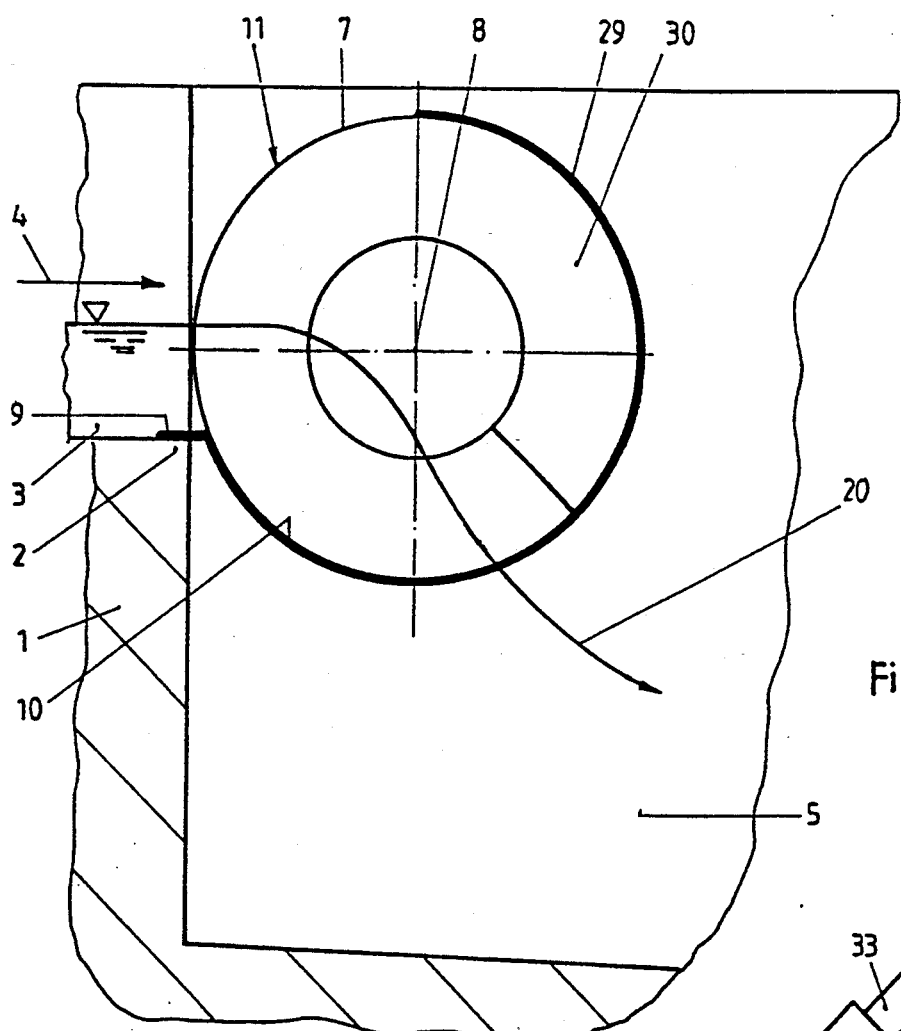

The embodiment of FIG. 3 is a structural unification of the separation area 10, the takeover device 11 and the transverse conveyor 16. The separation area 10 is formed to be the inner surface of a screen 29, which also extends over a part of the perimeter of a cylinder jacket 7. The screen 29 is fashioned to be open towards the quantity of water 3 and connects with a continuation 9 to the overflow edge 2. The screen 29 has breakings, e.g. holes or slits, whose geometry and arrangement is adjusted to the size of the rakings to be separated. The takeover device 11 in form of a conveyor helix 30, which is supported preferably shaftless in the housing-like screen 29 and driven accordingly, is assigned to the separation area 10. The outer edge of the conveyor helix 30 brushes again and again along the screen 29 and especially along the separation area 10, so that the rakings are taken and moved sideways in the direction of the axis 8.

Figure 4:
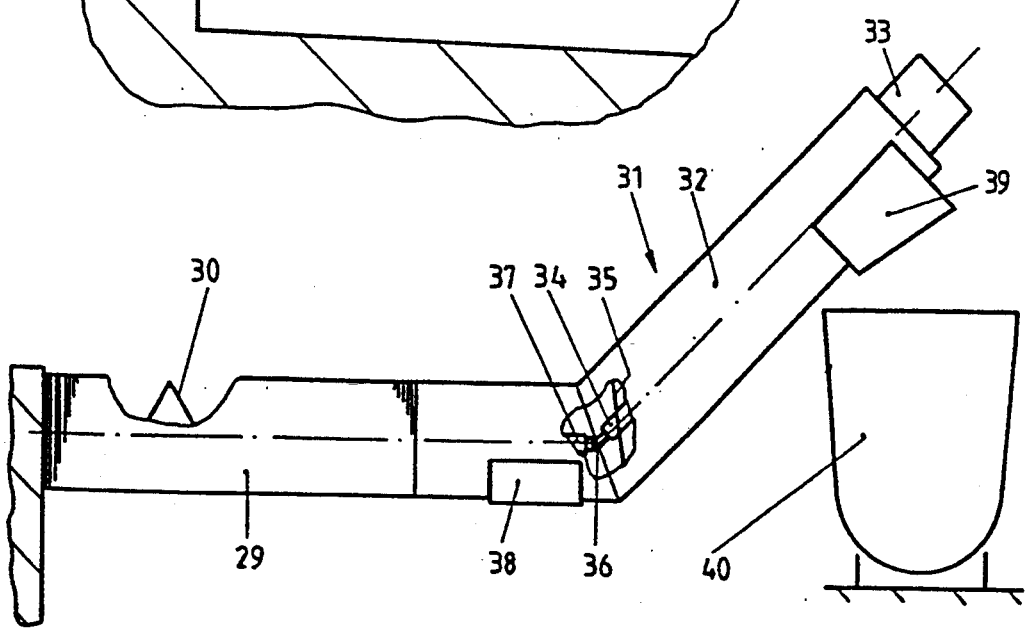

It can be seen from FIG. 4 that the device can be continued in an upwards directed conveyor line 31, in the housing 32 of which a motor 33 driving a shaft 34 with a conveyor helix 35 is provided. The shaft 34 may be connected to a cardan joint 36 and a shaft stub 37, which carries and drives the conveyor helix, which for most of its length is shaftless. A lid 38 may be provided, so that the rakings can be removed and carried away at this position. Usually, though, the rakings are transported up the conveyor line 31 and dropped through a discharge chute 39 into a container 40.

While the foregoing specification and drawings describe a preferred embodiment of the invention, it will be understood by those skilled in the art that variations and modifications of the disclosed embodiment may be made without departing from the spirit and scope of the invention as described by the following claim.

LIST OF REFERENCE NUMERALS

1—wall
2—overflow edge
3—quantity of water
4—arrow
5—overflow basin
6—grating bar
7—cylinder jacket
8—axis
9—continuation
10—separation area
11—takeover device
12—shaft
13—arm
14—finger
15—arrow
16—transverse conveyor
17—housing
18—shaft
19—conveyor helix
20—drop-over line
21—passing-on device
22—rake
23—axis
24—stop
25—cam
26—edge
27—arrow
28—arrow
29—screen
30—conveyor helix
31—conveyor line
32—housing
33—motor
34—shaft
35—conveyor helix
36—cardan joint
37—shaft stub
38—lid
39—discharge chute
40—container

I claim:

1. A device for collecting and removing material and debris from a liquid flow passing into an overflow basin, the basin having a generally horizontal bottom wall and at least one generally vertical wall extending upward therefrom to form the basin, comprising:

an elongated substantially horizontal overflow edge over which the fluid flow passes downwardly into the basin, said overflow edge being formed at the top of the generally vertical wall forming the basin;

an elongated filter screen, said filter screen being supported overflow edge, the filter screen having an elongated axis extending parallel to the overflow edge, wherein said axis is positioned at the same height as the overflow edge above the basin;

said filter screen being formed as a screen for a cylinder having an elongated side opening extending the length of the filter screen along the overflow edge for receiving the liquid flow passed over said overflow edge, wherein said filter screen extends through an are of no less that one-hundred (180) degrees;

a separation area formed on that portion of said filter screen through which the liquid flow passes downwardly into the basin for collecting material and debris from the liquid flow passed therethrough; and takeover device means for removing the material and debris collected on said separation area from said filter screen.

2. The device of claim 1 wherein said takeover device means comprises:

a screw conveyor, wherein said screw conveyor has a conveyor helix with a shaft extending along the axis of said filter screen:

means for rotating said conveyor helix about said shaft:

wherein said conveyor helix rotates about said shaft and brushes along the separation area and the filter screen to remove material and debris collected thereon from said filter screen.

3. The device of claim 2 wherein said conveyor helix moves the material and debris collected on said filter screen transverse to the direction of the liquid flow passing over the overflow edge.

4. The device of claim 2 further comprising a conveyor line, wherein said conveyor line is connected to said screw conveyor and transports the collected material and debris from said screw conveyor upward toward a discharge chute.

5. The device of claim 1, wherein said filter screen comprises a plurality of spaced apart grating bars.

6. A device for collecting and removing rakings from a flow of water (3), from a rainwater reservoirs the flow of water passing downward into a basin (5), comprising:

a generally horizontal overflow edge (2) over which the flow of water passes into the basin said overflow edge being formed at the top of a generally vertical wall forming the basin;

an elongated concave filter screen (29), said filter screen being supported on the overflow edge, the filter screen having a longitudinal axis (8) oriented parallel to and at the same height as the overflow edge above the basin, said filter screen formed as a section for a cylinder extending in an arc of more than one hundred-eighty (180) degrees about said longitudinal axis and defining an elongated opening extending the length of the cylinder along the overflow edge for receiving the flow of water and the rakings in said concave filter screen and collecting the rakings thereon;

elongated helical conveyor means (30) rotatably mounted in and extending along the length of said concave filter screen; and drive means (33) for rotating said helical conveyor means approximately about the longitudinal axis of said concave filter screen for urging the rakings collected on the concave filter screen away from the flow of water entering the concave filter screen.

* * * * *